Feb. 14, 1950 J. HELSTROM 2,497,603
WINCH
Filed March 26, 1945
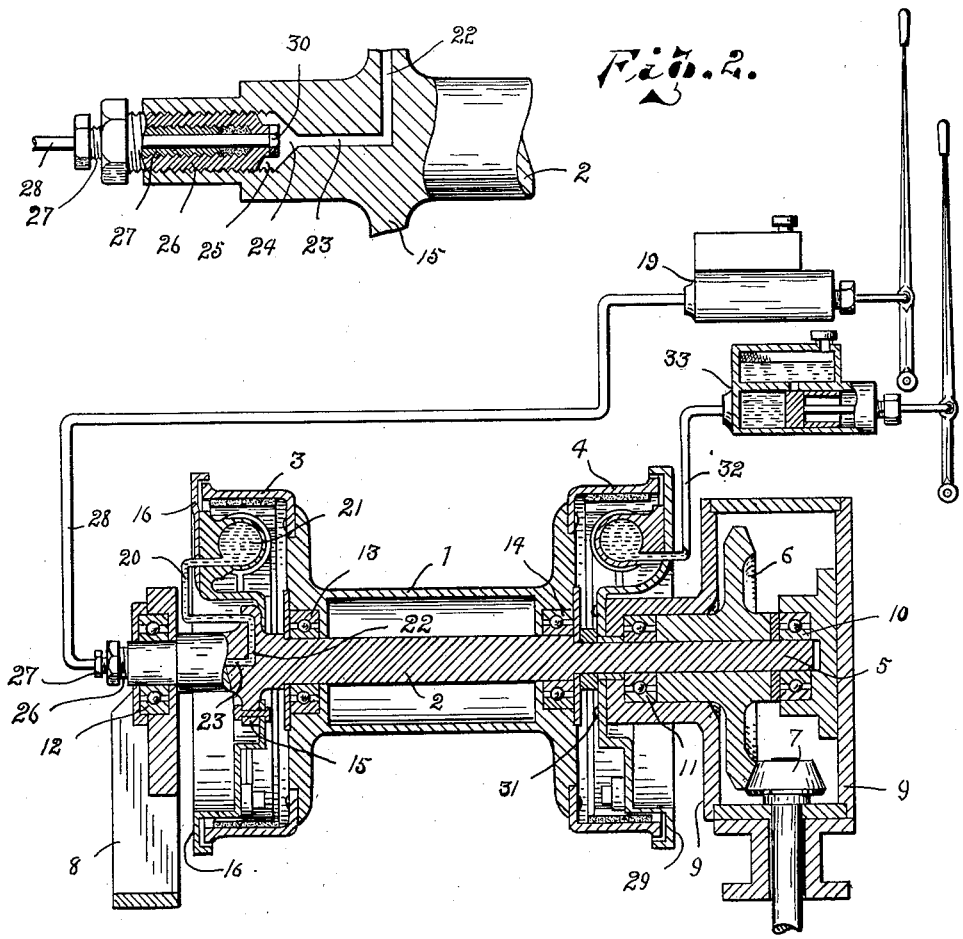
Fig. 2.
Fig. 1.
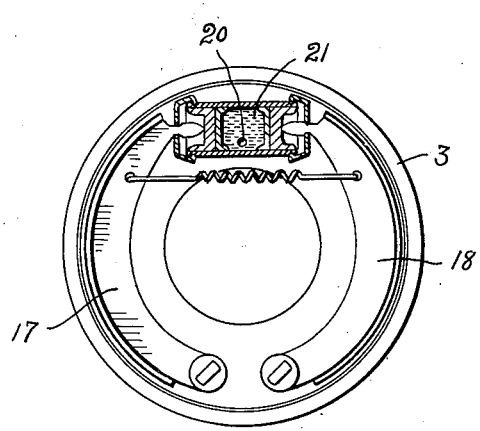
Fig. 3.
INVENTOR.
Julmer Helstrom
BY Geo Stevens
atty.

Patented Feb. 14, 1950

2,497,603

UNITED STATES PATENT OFFICE 2,497,603

WINCH

Julmer Helstrom, Cook, Minn.

Application March 26, 1945, Serial No. 584,850

5 Claims. (Cl. 254—187)

This invention relates to winding drums or winches, the principal object being to provide such a drum assembly with efficient means for both operating and controlling same within a minimum of space; thus providing such an instrumentality particularly adapted for installation upon a truck or tractor such as used in the handling of pulp wood, small logs or the like, the same being somewhat similar to my copending patent application, Serial No. 567,627, now Patent No. 2,463,968, dated March 8, 1949, for a winch.

Another object is to provide a drum of this character having operating means at one end and braking means at the other for the more simple concentration of such parts.

Other objects and advantages of this invention may appear in the further description thereof.

Referring now to the accompanying drawing forming part of this application wherein like reference characters indicate like parts:

Fig. 1 is a vertical, central sectional view of the complete drum assembly showing its association with one convenient arrangement of manual control means.

Fig. 2 is an enlarged similar view of only the power transmitting end of the drum shaft, and Fig. 3 is a diagrammatic elevation of a conventional hydraulic engaging means, either for braking or transmitting purposes.

In the assembly hereshown, one of these hydraulic engaging means is employed in each end of the winding drum 1, the latter being enlarged alike at both ends to form a suitable housing therefor, the annular housing for the power transmission from the shaft 2 to the drum being illustrated at 3, and that for the braking means is shown at 4.

The end 5 of the power transmitting shaft 2 is somewhat reduced for convenient assembly for driving means hereshown as a bevel gear 6, keyed or otherwise, fixed thereto and meshing with the take-off pinion 7 as might extend from any source such as a truck, tractor or the like as previously stated. If such is the case, it is obvious that some form of bracket supports as indicated at 8 and 9 must be provided and emanating from the same vehicle or whatever the source may be, here not shown.

The bearings for the drum shaft 2 within the bracket 9 are shown as at 10 and 11; while the one at the opposite end and upon the bracket 8 is shown at 12, and like, or equally efficient bearings for the drum 1 upon the shaft 2 are shown at 13 and 14.

It is to be noted that the end of the shaft opposite to that just described as 5, is somewhat enlarged and also provided with a ring-like flange 15 spaced inwardly from the extreme stepped end and also occurring substantially centrally of the enlarged housing 3 of the drum 1.

This flange or rim is primarily for support of a stepped head 16 as clearly illustrated, and also carries the hydraulic expansive engaging means, which, in this instance, acts as a clutch, thus attached to the shaft and optionally engageable with the drum for rotating same.

This stepped head carries the hydraulically-operated expansive friction band-carrying shoes 17 and 18, and evidently must have pipe connection with its fluid source, as suggested at 19, which may be hand controlled by any practical means. The pipe connection at 20 leads from the expansive chamber 21 for expanding the opposed termini of the band shoes 17 and 18 and thence into a suitable hole in the flange 15 communicating with the radial hole 22 leading to the axial hole 23 in the shaft 2. This latter hole 23 is only partly shown in Fig. 1 due to lack of space, but it is more clearly illustrated in Fig. 2 where its receiving end is fanned outwardly as at 24 as the inner terminus of the internally screw-threaded bore 25 receives the axially adjustable plug 26 carrying the stuffing gland 27 of the fluid supply pipe 28 which leads from the source previously indicated by the numeral 19 and about which, the shaft 2 rotates.

This stuffing gland is deemed sufficiently common and obvious so as not to require further explanation except that the pipe 28 must be provided with a suitable nut 30 externally of the inner end of the plug 26 to prevent extrusion of the pipe by fluid pressure within the shaft when the clutch is functioning.

Thus it is apparent that as the shaft 2 rotates, and it is desired to rotate the drum, all that is necessary is to manually compress the fluid in the pipe line just described when the friction or band-carrying members 17 and 18 will function as a very efficient clutch and thus transmit the motion of the shaft 2 to the winding drum.

Now the exact arrangement of band-carrying shoes is established within the opposite housing 4 of the drum except that in this instance the stepped head 29, to which they are attached, is fixed as at 31 to the supporting bracket 9 of the assembly, and any application of the bands at this end of the drum evidently acts as a brake to the movement of the drum.

In this instance, the fluid pipe 32 leads from a manually controlled supply suggested at 33 similar to that at 19, and both of which, may be juxtaposed any place most convenient for the operator; thus affording ideal control of the drum and an assembly exceedingly simple and compact.

Having thus described my invention, what I claim and desire to secure by Letters Patent is:

1. A winch operating device comprising; a power shaft, a winding drum normally freely rotatable upon said shaft, an hydraulic clutch mechanism having expansive shoes carried by and rotatable with said shaft for coactive engagement with one end of said drum for driving same from said shaft, clutch operating means, fixed supporting means adjacent the opposite end of said shaft, an hydraulic brake mechanism supported upon said fixed means for coactive engagement with the opposite end of said drum, and independent fluid pressure lines for each of said hydraulic means, said clutch operating means comprising an expansive fluid chamber adapted to expand said shoes to engage one end of said drum, a bore axially of the end of said shaft adjacent said clutch, a fluid supply line leading from the inner end of said bore to said chamber, a plug installed within said bore, an adjustable stuffing gland installed axially of said plug, and one of said fluid pressure lines extending axially within and through said gland and plug and having a flange on the end thereof within said bore.

2. A winch comprising a power shaft, a winding drum normally freely rotatable on said shaft, said drum having a flange on each end thereof, an hydraulic clutch mechanism having band shoes, said clutch being carried by and rotatable with said shaft for driving said drum from said shaft, said clutch being engageable with one of said flanges, an hydraulic brake mechanism fixedly carried adjacent the opposite end of said drum, said brake being engageable with the other of said flanges to stop the rotation of said drum, a manual control for said brake, and control means for said clutch comprising, a manually controlled fluid source, an expansive fluid chamber adapted to expand said shoes to engage said flange, a bore axially of the end of said shaft adjacent said clutch, a fluid supply line leading from the inner end of said bore to said chamber, a plug installed within said bore, an adjustable stuffing gland installed axially of said plug, and a fluid supply line leading from said source and extending axially within and through said gland and plug, said last mentioned line having a flange on the end thereof within said bore.

3. A winch comprising a power shaft, a flanged winding drum normally freely rotatable on said shaft, an hydraulic clutch mechanism having band shoes said clutch being carried by and rotatable with said shaft for driving said drum from said shaft, said clutch being engageable with one of said flanges, a brake mechanism fixedly carried adjacent the opposite end of said drum to stop the rotation of said drum, control means for said brake, and control means for said clutch comprising a fluid source, means to control said source, an expansive fluid chamber adapted to expand said shoes to engage said flange, a bore axially of the end of said shaft adjacent said clutch, a fluid supply line leading from the inner end of said bore to said chamber, a plug installed within said bore, an adjustable stuffing gland installed axially of said plug, and a fluid supply line leading from said source and extending axially within and through said gland and plug, said last mentioned line having a flange on the end thereof within said bore.

4. A winch comprising a power shaft, a winding drum normally freely rotatable on said shaft, an hydraulic clutch mechanism having shoes, said clutch being carried by and rotatable with said shaft for driving said drum from said shaft and said shoes being engageable with said drum to effect a driving connection between said shaft and drum, and control means for said clutch comprising a fluid source, means to control said source, an expansive fluid chamber adapted to move said shoes to engage said drum, a bore axially of the end of said shaft adjacent said clutch, a fluid supply line leading from the inner end of said bore to said chamber, a plug installed within said bore, a fluid supply line leading from said source and extending axially within said plug to connect said first mentioned fluid supply line to said source, said second mentioned supply line being secured against removal from said plug, and means for preventing the loss of fluid from said bore.

5. A winch comprising a power shaft, a winding drum normally freely rotatable on said shaft, an hydraulic clutch mechanism having shoes, said clutch being carried by and rotatable with said shaft for driving said drum from said shaft and said shoes being engageable with said drum to effect a driving connection between said shaft and drum, and control means for said clutch comprising a fluid source, means to control said source, an expansive fluid chamber adapted to move said shoes to engage said drum, a bore axially of the end of said shaft adjacent said clutch, a fluid supply line leading from the inner end of said bore to said chamber, a plug installed within said bore, a fluid supply line leading from said source and extending axially within said plug to connect said first mentioned fluid supply line to said source, said second mentioned supply line being secured against removal from said plug, and a stuffing gland installed axially of said plug and having said second mentioned fluid supply line extending axially therethrough.

JULMER HELSTROM.

REFERENCES CITED

The following references are of record in the file of this patent:

UNITED STATES PATENTS

| Number | Name | Date |
| --- | --- | --- |
| 906,841 | Whitcomb | Dec. 15, 1908 |
| 1,861,703 | Macy | June 7, 1932 |
| 2,159,137 | Doty | May 23, 1939 |
| 2,189,373 | Steel | Feb. 6, 1940 |
| 2,279,597 | Selmer | Apr. 14, 1942 |
| 2,317,171 | Berby | Apr. 20, 1943 |
| 2,326,935 | Ferguson | Aug. 17, 1943 |